Feb. 22, 1938.                J. URBAN                 2,108,952
                            STRIPING TOOL
                         Filed July 14, 1937
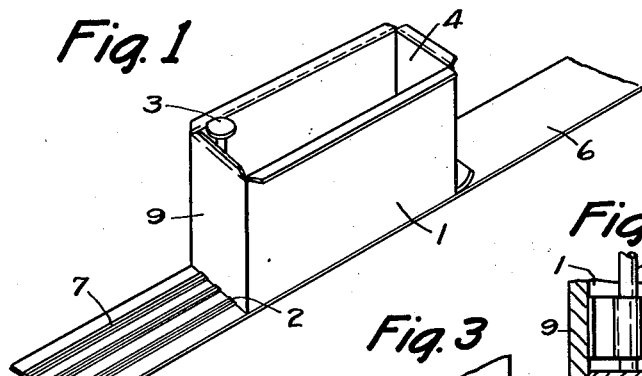
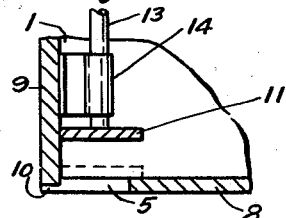
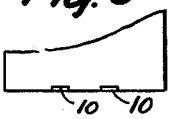
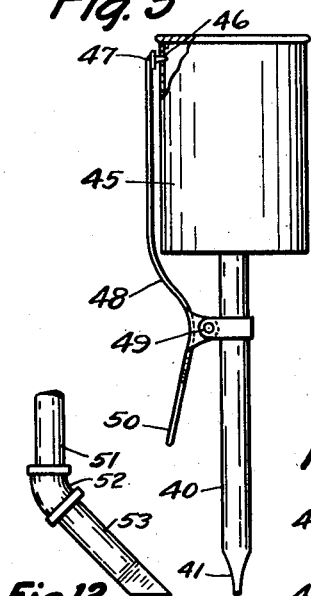
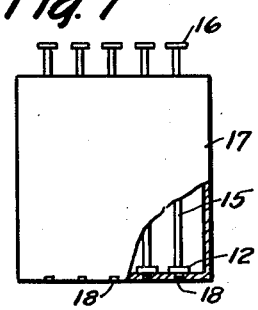
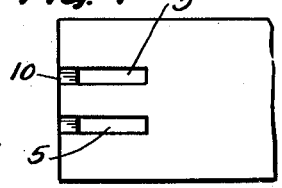
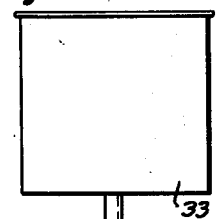
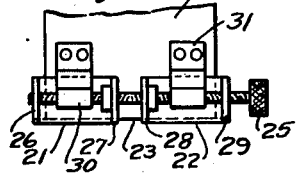
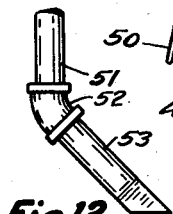
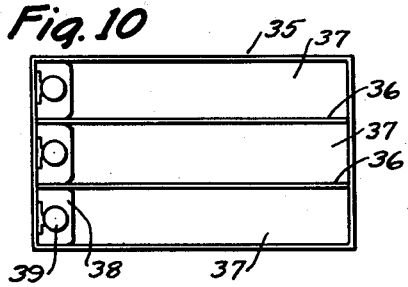
INVENTOR.
John Urban
BY James Harrison Bowen
ATTORNEY.

Patented Feb. 22, 1938

2,108,952

UNITED STATES PATENT OFFICE 2,108,952

STRIPING TOOL

John Urban, West New York, N. J.

Application July 14, 1937, Serial No. 153,599

5 Claims. (Cl. 91—62.6)

The purpose of this invention is to provide a tool, by which stripes, lines or the like, may readily be placed on strips of material, or other surfaces, by moving said device over said material, or by moving the material under the device.

The invention is a striping tool, having a plurality of slots in the under-surface and at one end thereof, in which a check or limiting means is provided at the ends of the slots to check the amount of fluid passing out, and, at the same time, permitting contact with the fluid and the surface upon which lines, stripes, and the like, are to be placed.

Lines, stripes, and different designs, have been placed upon objects by stencils, printing, and various other means, however, there are some materials upon which printing is unsatisfactory, and stencils are not adaptable, and, therefore, it is desired to provide means whereby stripes may readily be placed upon the surface of material by flowing paint, lacquer, or the like, through restricted openings.

The object of the invention is to provide a striping tool, by which paint, lacquer, or the like, may be placed on material in lines, stripes, or the like, by flowing the material through restricted openings as the device is passed over the surface thereof.

Another object is to provide restricting means in slots, through which material passes to a surface which checks the amount of material, and accurately defines the lines or stripes.

Another object is to provide a striping tool, in which the arrangement of the stripes may readily be adjusted.

A further object is to provide a striping tool having a plurality of openings in a container, in which means is provided for readily opening and closing the openings.

And a still further object is to provide a striping tool, which is of a simple and economical construction.

With these ends in view the invention embodies a receptacle having an under-surface adapted to conform to a surface to be striped, having slots in said lower surface, opening and closing means for said slots, and restricting means in the ends of said slots.

Other features and advantages of the invention will appear from the following description taken in connection with the drawing, wherein:

Figure 1 is a view showing the device placing the stripes upon a flat strip of material.

Figure 2 is a detail, showing a cross-section through the lower corner of the device with the thickness of the parts exaggerated, and showing the closure in the open position.

Figure 3 is a detail, showing a front view of the lower corner of the device.

Figure 4 is a plan view looking toward the underside of the corner of the device as shown in Figure 2.

Figure 5 is a view showing the device as an alternate design, in which it is in the form of a pencil, with the marking slot at the lower end, and a supply container at the upper end.

Figure 6 is a detail showing a cross-section through the tip of the device shown in Figure 5.

Figure 7 is a view showing an alternate design with part broken away, and in which a closure is provided for each slot.

Figure 8 is a view showing an alternate design, in which means is provided for adjusting the width of the slots.

Figure 9 shows an assembly view, in which the receptacle 1 is filled from a larger supply container.

Figure 10 is a plan view, showing another alternate design, in which the receptacle is divided into separate compartments, so that material of different colors may be used to form lines or stripes of different colors.

Figure 11 is a view similar to that shown in Figure 3, showing the one wide slot for flowing a wide stripe, instead of three narrow stripes.

Figure 12 is a detail showing the tube in the design shown in Figure 5 bent at an angle of about 45°.

In the drawing, the device is shown as it may be made, wherein numeral 1 indicates a container, numeral 2 a slot forming an opening at the lower end of the container, and numeral 3, a button by which said slot may be opened and closed.

In Figure 1 a simplified form of the device is shown, in which the device is in the form of a rectangular shaped receptacle, having an opening 4 with slots 5 in the lower forward corner, and as a strip of material 6 is drawn under the device, or the device passes over the strip of material, stripes 7 are placed on the strip, as shown in the drawing.

The peculiar arrangement of the slots or openings 5 make it possible to exactly define the stripes, bands or lines produced by this device; and it will be noted in Figure 2, in which the size of the parts is exaggerated, the slots 5 are formed in a bottom plate 8, and a front plate 9 extends downward, providing very narrow or thin openings 10 at the forward ends of the slots 5. Paint, lacquer, or the like, in the container 1, passes downward through the slots 5, and the thickness thereof, on the strips of material upon which the lines or stripes are placed, is determined by the thickness of the opening 10 in the forward end of the slot. It will be understood that the width or size of the opening 5 may be varied, so that lines or stripes of any width may be obtained, and so that any amount of the fluid may be deposited upon the surface.

The device is provided with a plate 11, forming a closure for the opening 5, and this may extend across the front of the casing as shown in Figure 2 to close all of the openings, or individual plates 12 may be provided as shown in Figure 7 to close each slot, making it possible to open one, two, or any number of slots to obtain any number of lines.

In the design shown in Figure 2, the plate 11 is mounted on the lower end of a rod 13, and the rod is slidably held in bearings 14 on the inside of the plate 9, and at the upper end of the rod is a button 3, by which it may be raised and lowered to open and close the slots. In the design shown in Figure 7, the plates 12 are mounted upon rods 15, similar to the rods 13, and each of these rods is provided with a button 16 at the upper end, by which it may be raised or lowered. In this design the casing is indicated by the numeral 17, and this is provided with slots 18 in the lower, forward corner, corresponding to the slots 5.

In Figure 11, another alternate design is shown, in which one wide slot 19 is provided instead of the three slots shown in Figure 1, and it will be understood that one, two, or any number of slots may be used, and these may be wide, or narrow, as may be desired. Another alternate design is shown in Figure 8, in which the forward corner 20 of the casing is formed with two angular plates 21 and 22, and these are mounted against the under-surface, and positioned to provide a slot 23 between the inner ends thereof, so that they may be moved to regulate the size of the slot. A threaded rod 24, with a knob 25 at the outer end, extends through flanges 26, 27, 28, and 29 on the members 21 and 22, and the rod is also held in bearings 30 and 31. With right and left hand threads on the rod, as indicated in the drawing, it may be turned by the knob 25 to move the plates 21 and 22 together or apart, to regulate the width of the line. This is just a typical arrangement, and it will be understood that any means may be used for regulating the width of the lines.

In the design shown in Figure 9, the receptacle 1 is shown mounted on the lower end of a supply tube 32, and this is connected to a supply container 33, and provided with a valve 34, and it will be understood that a fluid may be placed in the container 33, and this may be supplied to the container 1 continuously, or as desired.

In the design shown in Figure 10, the receptacle 35, similar to the receptacle 1, is formed with partitions 36, providing separate compartments 37, so that different colored paints or fluids may be placed in the respective compartments in order to produce lines or stripes of different colors. In this design, each of the compartments is provided with a closure 38, and a button 39, by which it may be opened and closed.

In the design shown in Figure 5, the device is in the form of a pencil, with the openings provided in the lower end of a tube 40, in which the lower end of the tube is flattened, as shown at the point 41, and provided with a bevel surface 42, with a slot 43 therein, and with a relatively small opening 44 at the front, corresponding with the opening 10, in the design shown in Figure 2. In this design the tube 40 extends downward from a sealed container 45, and the container may be provided with an inlet opening 46, having a pin 47, on a lever 48, fulcrumed at the point 49, adapted to be inserted in, or removed from said opening by pressing on the lower end 50 thereof, to regulate the flow of a fluid in a container; as, as air is admitted, it will permit the fluid to flow downward through the tube 40. The tube 40 may be bent as shown in Figure 12, or may be formed with an elbow as shown, in which the tube is indicated by the numeral 51, and this has an elbow 52, and the slot is formed in a portion 53, similar to the tube shown in Figure 6.

It will be understood that other changes may be made without departing from the spirit of the invention. One of which changes may be in the use of slots or openings of any other shape or design, another may be in the use of any other means for opening and closing the said slots, another may be in the use of any number of these devices in combination, to provide different combinations of lines or stripes, and still another may be in the use of two of said devices in sequence, with one placing a wide stripe on the material, and the other placing one or more stripes on said wide stripe.

The construction will be readily understood from the foregoing description. In use the device may be provided in relatively small units, as shown in Figure 1, or these units may be used in combination with supply containers, as shown in Figure 9, or they may be installed in machines, in which the material may be fed to them by any suitable feeding means. The lacquer, shellac or the like, or any other suitable marking fluid, may be placed in the individual containers, or in upper supply containers, and may be piped to the individual containers to provide continuous operation, and the openings forming the stripes may be opened and closed as shown, or by any suitable closing means that may be operated from a remote point.

This device may, therefore, be used by, and as an independent unit, or mounted in any suitable manner, and material may be passed under it, or it may be passed over the material, and the openings may be of any size or width, or any number of openings may be used, and the device may also be formed to open and close any of the openings in order to provide any suitable combination of lines, stripes, or the like.

Having thus fully described the invention, what I claim as new and desire to secure by Letters Patent, is:

1. In a striping tool of the type having a reservoir in a container with a flat bottom, with slots in said bottom adjacent one side, and with notches in the lower edge of the side corresponding with said slots and communicating therewith; plates forming closures positioned above said slots and slidably mounted, said plates adapted to be lowered to close said slots, said device characterized in that, as material is passed under the device, a fluid therein will flow through the slots and notches forming stripes upon the material, and the amount of fluid may be regulated by said plates.

2. A striping tool, as described in claim 1, characterized in that each slot may be opened and closed independently.

3. A device as described in claim 1, further characterized in that each slot is in a separate compartment.

4. A device as described in claim 1, further characterized by means incorporated in said device for readily adjusting the width of the slots to regulate the width of the stripes, said means comprising slidable plates positioned at the end of the device with their lower edges adapted to define the notches at the ends of the slots.

5. In a device as described in claim 1, means in said device for providing a fluid of a different color to each slot.

JOHN URBAN.